April 24, 1951     J. J. CROOKSTON     2,550,331
VEHICLE SUSPENSION UNIT

Filed Feb. 12, 1947     3 Sheets-Sheet 1

INVENTOR.
JAMES J. CROOKSTON
BY
*Leon Edelson*
ATTORNEY

April 24, 1951     J. J. CROOKSTON     2,550,331
VEHICLE SUSPENSION UNIT
Filed Feb. 12, 1947     3 Sheets-Sheet 2
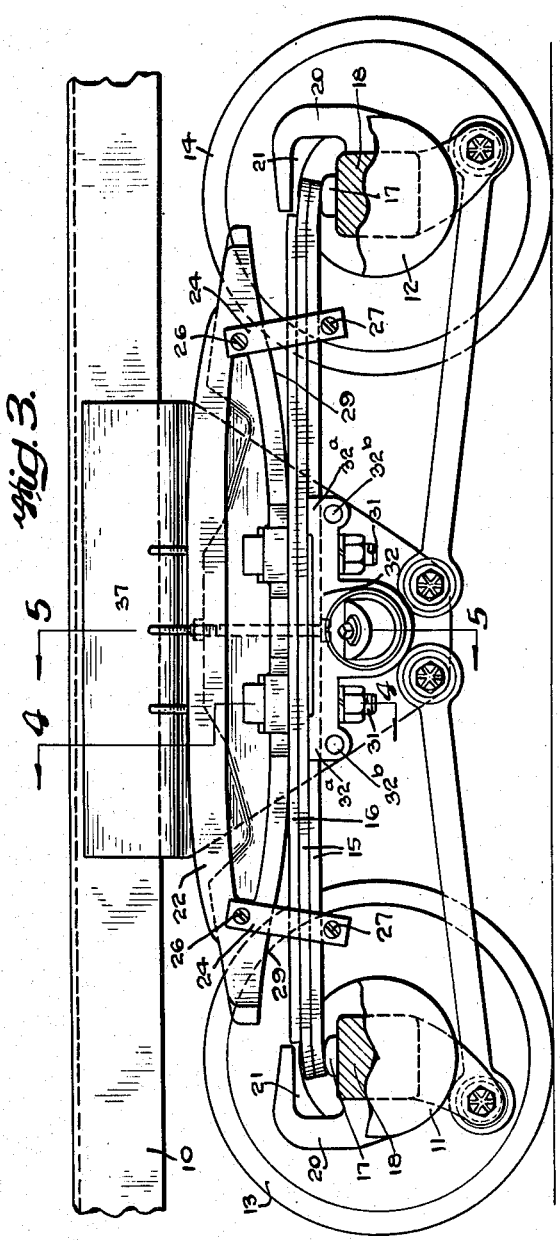
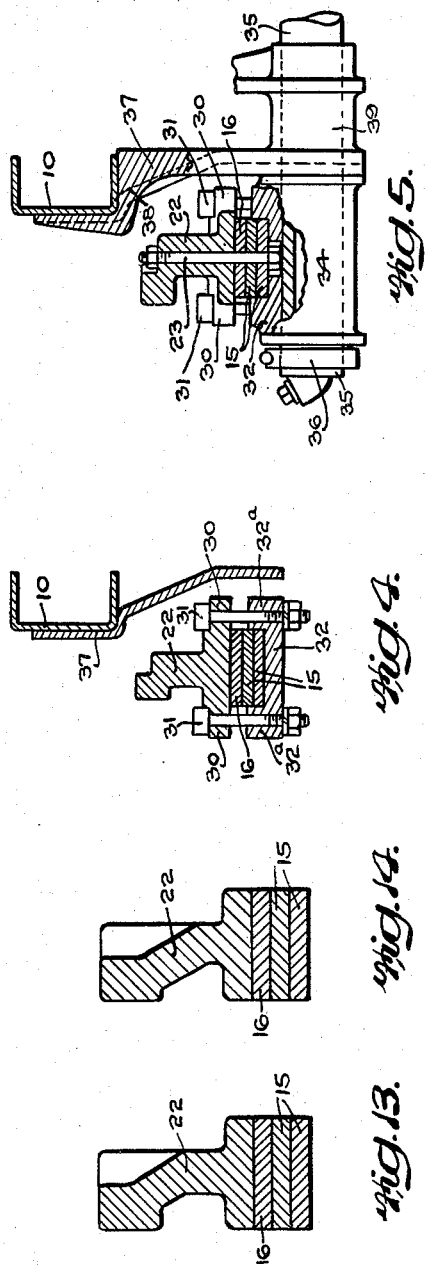
INVENTOR.
JAMES J. CROOKSTON
BY
*Leon Edelson*
ATTORNEY April 24, 1951     J. J. CROOKSTON     2,550,331
VEHICLE SUSPENSION UNIT
Filed Feb. 12, 1947     3 Sheets-Sheet 3
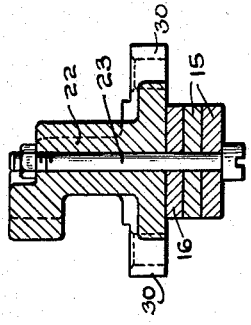
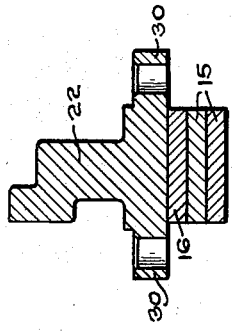
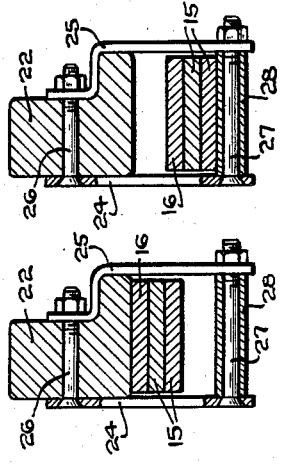
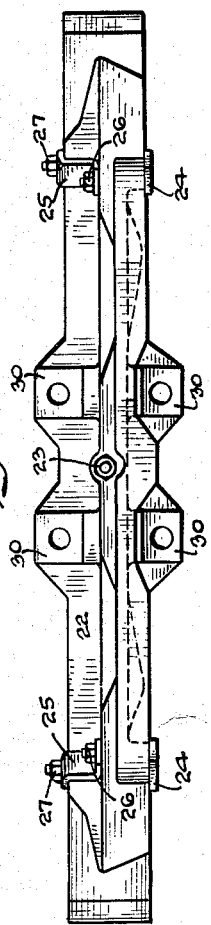
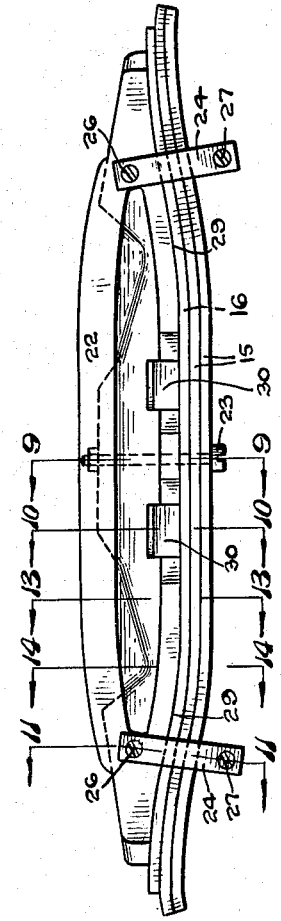
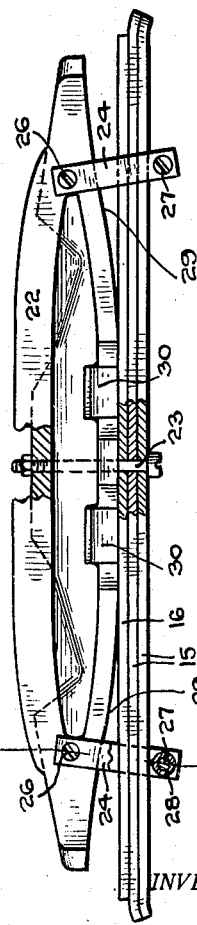
INVENTOR.
BY JAMES J. CROOKSTON
ATTORNEY Patented Apr. 24, 1951

2,550,331

UNITED STATES PATENT OFFICE 2,550,331

VEHICLE SUSPENSION UNIT

James J. Crookston, Moylan, Pa., assignor to The Autocar Company, Ardmore, Pa., a corporation of Pennsylvania Application February 12, 1947, Serial No. 728,131

4 Claims. (Cl. 280—104.5)

The present invention relates generally to load-carrying suspensions for automotive vehicles and more particularly to improvements in the construction of spring suspension units which are especially adapted for use in conjunction with the rear bogie of heavy-duty six-wheel trucks and other such vehicles employed in the transportation of unusually heavy and unwieldy loads.

The problem of transporting excessively heavy loads having high centers of gravity, as when it becomes necessary to trans-ship heavy industrial equipment from one location of use to another, has always presented serious difficulties and while, prior to the present invention, various expedients have been resorted to in an effort to solve the problem, none of them have been really adequate. As an illustration of a transportation difficulty, which the present invention is designed to overcome, reference is made to the general practice in the art of drilling oil-wells of transporting from one location to another drilling equipment which often weighs in the neighborhood of fifty tons and which is of such bulk as to present an exceedingly high center of gravity. To merely load such equipment upon a vehicle for transport to a distant point of use in itself poses a difficult problem, while its transportation via such vehicle is also beset with difficulties. Where the vehicle is equipped with conventional spring suspension units, even though they be designed to support exceedingly heavy loads, there is ever present the tendency on the part of the springs disposed on either side of the vehicle to flex unevenly under the heavy load to which they are subjected, in consequence of which the center of gravity of the load may shift laterally to an extent sufficient to result in overturning of the vehicle.

It is, of course, possible and it has been proposed to provide the vehicle with spring suspensions designed to support extraordinarily heavy loads, but such suspensions at best are but the equivalent of rigid suspensions and render it impracticable, if not impossible, to operate the vehicles economically under relatively light or no load conditions. In this connection, it will be understood that when the vehicle has transported its heavy load to a given location, it is frequently and usually necessary for the vehicle to move without load to a distant point to there pick up another load and since time consumed in travel without load is economically wasteful, every effort must be made to reduce such waste of time by operating the vehicle at as great a speed as possible. However, reasonable driving speeds under light or no-load conditions are not possible without some adequate spring suspension for the vehicle chassis and body and where the spring suspension units are designed solely to carry exceedingly heavy loads, they cannot function properly to permit economical and effective operation of the vehicle under light or no load conditions.

Having in mind the foregoing, it is among the objects of the present invention to provide an improved spring suspension for automotive vehicles which affords maximum stability under unusually heavy or overloaded conditions of operation of the vehicle; which functions to limit flexing of the spring elements of the suspension under over-load conditions of use, while at the same time permitting limited flexing of the spring elements to provide adequate spring support for the vehicle under relatively light or no-load conditions of operation thereof; which eliminates or prevents unstable conditions due to overload as tend to upset the vehicle; and which generally increases the operational effectiveness of six-wheel heavy duty trucks and other such vehicles equipped with the spring suspension units of the present invention.

Other objects and advantages of the invention will be apparent more fully hereinafter, it being understood that the present invention consists substantially in the combination, construction, location and relative arrangement of parts, as set forth in the detailed description which follows, as shown in the accompanying drawings and as finally pointed out in the appended claims.

In the accompanying drawings, which illustrate a preferred embodiment of a spring suspension unit constructed in accordance with the principles of the present invention—

Figure 1 is a plan view, medially broken away, showing the rear bogie of a six-wheel truck equipped with the suspension units of the present invention;

Figure 2 is a side elevational view thereof showing the suspension unit under overload conditions;

Figure 3 is a side elevational view thereof, similar to Figure 2, but showing the suspension unit under light or no-load conditions;

Figure 4 is a sectional view taken on the line 4—4 of Figure 3;

Figure 5 is a sectional view taken on the line 5—5 of Figure 3;

Figure 6 is a side elevational view of one of the spring suspension units showing its condition under over-load;

Figure 7 is a view similar to Figure 6 showing the condition of the suspension unit under light or no-load condition;

Figure 8 is a top plan view of the suspension unit shown in Figures 6 and 7;

Figures 9, 10, and 11 are sectional views taken respectively along the lines 9—9, 10—10 and 11—11 of Figure 6;

Figure 12 is a sectional view taken along the line 12—12 of Figure 7; and

Figures 13 and 14 are sectional views taken respectively along the lines 13—13 and 14—14 of Figure 6.

Referring now to the drawings and more particularly to Figures 1 and 2 thereof, it will be observed that in its preferred form of construction the spring suspension units of the present invention are mounted respectively below the side sills 10 of the vehicle underframe in position to transmit the supported load to the usual front and rear axle housings 11 and 12 of the rear bogie of the vehicle, these housings being conventionally tied together, as by conventional radius rods, with each axle thereof rotatably mounting a pair of single or dual wheels 13 and 14, as the case may be. In the present instance, there are two spring suspension units, each disposed at one side of the six-wheeled truck and extending between the front and rear axle housings of the rear bogie. Inasmuch as both of these spring suspension units are of like construction, the present description will be confined to the parts of one and like reference numerals applied to like parts of the other.

In the preferred embodiment of the invention, the spring suspension unit includes as an element thereof a group of superposed spring leaves, here shown as two leaves 15—15 of substantially equal length surmounted by a third leaf 16, preferably shorter than the other two. The length of each of the leaves 15—15 is such that the respective ends thereof seat and ride upon bearing elements 17—17 respectively upstanding from blocks 18—18 formed as associated parts of the axle housings 11 and 12.

In order to retain the ends of the leaves 15—15 against displacement from their engagement with the axle housings, while permitting proper contraction and elongation thereof under load, each block 18 is formed with an integral clip member 20 having an open-ended recess 21 into which is projected the freely projecting portions of the spring leaves 15 at one end of the suspension assembly, the clip members 20—20 being so disposed and dimensioned as to permit unrestricted endwise movement of the spring leaves 15—15 relatively to their bearing elements 17—17 while preventing excessive vertical displacement thereof with respect to the axle housings.

As a means for limiting the deflection of the set of spring leaves 15—15—16, a beam 22 of rigid material is centrally connected to the spring, by a bolt 23, as shown in Figure 9, the opposite ends of this beam being respectively provided with pairs of spring-retaining straps 24 and 25. The upper ends of each pair of these straps 24 and 25 are secured to the beam by a transversely extending bolt 26, while the lower ends thereof are interconnected by a bolt 27 transversing a spacer 28. Free vertical deflection of the opposite end portions of the leaves 15—15 and 16 is obtained by so shaping the bottom of the beam 22 as to provide the same with oppositely extending upwardly inclined surfaces 29—29 diverging from the spring, the inclination of these surfaces 29—29 being generally in conformity with the contour assumed by the spring leaves 15—15 and 16 when carrying the full load for which they are designed.

Since each pair of the straps 24 and 25 have a freely projecting or depending length greater than the combined thickness of the suspension spring leaves 15—15 and 16, the opposite end portions of the latter are free to flex relatively to the beam 22, as shown in Figures 11 and 12, which respectively show the position of the spring under its full and light loads. It should be noted that in section the beam 22 is of stepped configuration along the inner side thereof primarily to provide for clearance between the beam 22 and the bottom edge of the adjacent side sill 10 of the vehicle underframe and, secondarily to provide an adequate seat for the straps 24—25, which latter follow this stepped configuration to thereby maintain said straps in fixed inclined position relatively to the beam as shown. In order to lighten the weight of the beam 22 without any sacrifice in its strength, the outer side thereof is longitudinally recessed so that in vertical section the beam is of the shape and configuration shown in Figures 9 to 14, inclusive, it being understood that the beam is symmetrical in cross-sectional shape with reference to its central vertical plane extending transversely through the center bolt 23 thereof. As most clearly appears in Figures 8 to 10, the beam 22 is formed with oppositely disposed laterally extending bosses 30—30 arranged in pairs equally spaced laterally to either side of the longitudinal center of the beam, these bosses being each apertured for projection therethrough of a securing bolt 31 for a purpose to be presently described.

From the foregoing, it will be apparent that the spring suspension unit of the present invention consists essentially of the superposed spring leaves 15—15 and 16 in association with the deflection-limiting beam 22, the spring leaves and beam being secured together in the form of a self-sustaining assembly or unit by means of the center bolt 23 and the two pairs of the straps 24 and 25. These latter straps are so disposed as to prevent lateral shifting of the leaf spring and the beam relatively to each other, while permitting the oppositely extending unsecured end portions of the leaf spring to flex freely with respect to the beam 22 within the limits imposed by the inclined bottom surfaces 29—29 of the beam and the transverse bolts 26 extending between the free ends of the spring confining straps.

In order to centrally support the combined spring and beam assembly and provide for its proper pivotal action, a conventional saddle 32, forming a seat for the springs 15—15 and 16, is connected to the beam 22 by the bolts 31 passing respectively through the apertured bosses 30. The opposite end portions of the spring-supporting base of the saddle 32 are preferably slotted so that the laterally spaced side wall elements 32ª of the saddle may be drawn into clamping engagement with opposite edges of the spring leaves seated in the saddle by means of bolts 32$^b$ extending laterally through the slotted portions of the saddle, thus providing against relative movement between the saddle and the central portion of the suspension unit supported thereby. That portion of the saddle 32, which is in alinement with the center bolt 23, is formed with a trunnion 34 supported by and pivotally carried by the conventional transverse tube 35 of the vehicle understructure, said tube extending from one side of the truck to the other in the usual manner. A retaining clamp 36 on the end of the tube 35 prevents endwise movement of the trunnion 34 and secures the saddle in position, as shown. The tube 35 is supported from the sill 10 by a depending bracket plate 37, the sill contacting portion of which is offset, as at 38, to conform to and fit about the bottom and the outer face of the sill 10, the lower end of the bracket plate 37 being integrally formed with a suitably bored supporting member 39 through which the tube 35 is projected.

In describing the operation of the spring suspension of this invention, reference is made to Figures 6, 7, 11 and 12, wherein the action of the spring is shown under different load conditions. Thus, in Figures 6 and 11, illustrating a condition of over load, the load of the vehicle causes the spring to flex to its maximum permissible degree, in which condition the spring leaves 15—15—16 are flexed as a unit to closely conform to the contour of the lower face of the rigid beam 22, which latter thus serves to prevent any further deflection of the spring leaves. Under such condition of maximum load, the spring leaves of the suspension unit shift upwardly and away from the lower flex-limiting bolts 27 of the unit and become, in effect, a rigid part of the beam 22.

Figures 7 and 12 show the suspension unit under conditions of light or no load, in which case the oppositely extending portions of the spring leaves 15—15—16 are free to flex within the limits imposed by the beam 22 and the transverse bolts 27 in order to absorb vibrations and shocks caused by irregularities in the road surface.

From the foregoing it will be apparent that the present invention has provided a novel side suspension unit for the rear bogie of a heavy-duty six-wheel truck which is operative under overload conditions to serve as a non-flexing rigid support for stabilizing the vehicle against all possibility of overturning, while at the same time being operative under conditions of light or no load to function as a flexible suspension for the truck.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. In a six-wheel automotive vehicle of the type having a rear bogie and which is characterized by the provision of a body-supporting frame having a pair of laterally spaced longitudinally extending sill members each of which supports a laterally projecting trunnion; a pair of side suspension units for the rear bogie of said vehicle respectively disposed beneath the horizontal plane of said sill members and oscillatably mounted upon the trunnions associated with the latter, each of said oscillatably mounted units comprising a plurality of superposed spring leaves forming a leaf-spring assembly adapted to be supported by its extremities between tandem wheels of the bogie and a rigid beam superposed on and secured to said leaf spring assembly, said beam having end portions vertically spaced from said leaf spring assembly under light vehicle load conditions but forming flexure-limiting abutments under heavy vehicle loads, said beam being substantially coextensive in length with the unsupported length of the leaf spring assembly whereby under light load said assembly is free to flex, while under heavy load flexing thereof is completely prevented.

2. In a six-wheel automotive vehicle of the type having a rear bogie and which is characterized by the provision of a body-supporting frame having a pair of laterally-spaced longitudinally extending coplanar sill members each of which supports a laterally projecting trunnion: a pair of side suspension units for the rear bogie of said vehicle respectively disposed beneath the horizontal plane of said sill members and oscillatably mounted upon the trunnions associated with the latter, each of said units comprising a plurality of superposed spring leaves forming a leaf spring adapted to be supported at its opposite extremities between tandem wheels of the bogie and a rigid beam substantially coextensive in length with the unsupported length of the leaf spring, said beams being independent of the sill member of the vehicle frame and being respectively oscillatable with their associated leaf springs about the trunnions aforesaid, each of said beams having end portions longitudinally curved in conformity with the contour assumed by its associated leaf spring when the latter is subjected to a load in excess of the weight of the vehicle body itself, whereby upon imposition of such overload said spring and beam constitute conjointly a rigid, nonflexing vehicle suspension unit.

3. In a six-wheel automotive vehicle of the type having a rear bogie and which is characterized by the provision of a body-supporting frame having a pair of laterally-spaced longitudinally extending coplanar sill members each of which supports a laterally projecting trunnion: a pair of side suspension units for the rear bogie of said vehicle respectively disposed beneath the horizontal plane of said sill members and oscillatably mounted upon the trunnions associated with the latter, each of said units comprising a plurality of superposed spring leaves forming a leaf spring adapted to be supported at its opposite extremities between tandem wheels of the bogie and a rigid beam substantially coextensive in length with the unsupported length of the leaf spring, said beams being independent of the sill member of the vehicle frame and being respectively oscillatable with their associated leaf springs about the trunnions aforesaid, each of said beams having end portions longitudinally curved in conformity with the contour assumed by its associated leaf spring when the latter is subjected to a load in excess of the weight of the vehicle body itself, whereby upon imposition of such overload said spring and beam constitute conjointly a rigid, nonflexing vehicle suspension unit, means anchoring the central portion of said beam to said leaf spring, and means forming lost-motion connections between the ends of said beam and the corresponding ends of said leaf spring.

4. In a side suspension unit for a six-wheel automotive vehicle as defined in claim 3 wherein said last-mentioned lost-motion connecting means includes pairs of straps embracing opposite end portions of said leaf spring, the straps of each pair thereof having their upper ends secured to the beam and their lower ends secured together by a member extending transversely of the beam and in vertically spaced relation with respect thereto.

JAMES J. CROOKSTON.

REFERENCES CITED

The following references are of record in the file of this patent:

UNITED STATES PATENTS

| Number | Name | Date |
|---|---|---|
| 343,153 | Purple | June 1, 1886 |
| 1,022,913 | Woodward | Apr. 9, 1912 |
| 1,188,684 | Serrell | June 27, 1916 |
| 1,789,845 | Shore | Jan. 20, 1931 |
| 2,078,521 | Alden | Apr. 27, 1937 |
| 2,198,616 | Hickman | Apr. 30, 1940 |
| 2,351,001 | Buckendale | June 13, 1944 |
| 2,387,265 | Holland | Oct. 23, 1945 |

FOREIGN PATENTS

| Number | Country | Date |
|---|---|---|
| 243,778 | Great Britain | Dec. 2, 1925 |